US012617141B2

(12) United States Patent　　　　　(10) Patent No.:　US 12,617,141 B2
Driehuis　　　　　　　　　　　　　　　(45) Date of Patent:　　　May 5, 2026

(54) METHOD FOR PRE-FORMING A CURVED THERMOPLASTIC LAMINATE AND PRE-FORMED THERMOPLASTIC LAMINATE

(71) Applicant: AUTOGLAS D & K B.V., Alphen aan den Rijn (NL)

(72) Inventor: Bartholomeus Leonardus Marinus Borcherd Driehuis, Alphen aan den Rijn (NL)

(73) Assignee: AUTOGLAS D & K B.V., Alphen aan den Rijn (NL)

( * ) Notice: Subject to any disclaimer, the term of this patent is extended or adjusted under 35 U.S.C. 154(b) by 203 days.

(21) Appl. No.: 18/571,894

(22) PCT Filed: Jun. 20, 2022

(86) PCT No.: PCT/NL2022/050349
§ 371 (c)(1),
(2) Date: Dec. 19, 2023

(87) PCT Pub. No.: WO2022/271015
PCT Pub. Date: Dec. 29, 2022

(65) Prior Publication Data
US 2024/0286339 A1　　　Aug. 29, 2024

(30) Foreign Application Priority Data

Jun. 21, 2021　(NL) ..................................... 2028493

(51) Int. Cl.
B29C 51/10　　　　(2006.01)
B29C 51/14　　　　(2006.01)
(Continued)

(52) U.S. Cl.
CPC .............. B29C 51/10 (2013.01); B29C 51/14 (2013.01); B29C 51/428 (2013.01);
(Continued)

(58) Field of Classification Search
CPC ........ B32B 17/10889; B32B 17/10495; B32B 17/10761; B32B 17/10844; B32B 27/08;
(Continued)

(56) References Cited

U.S. PATENT DOCUMENTS

| 5,024,085 | A | 6/1991 | Durand |
| 5,147,485 | A | 9/1992 | Gajewski et al. |

(Continued)

FOREIGN PATENT DOCUMENTS

| EP | 2647497 A1 | 10/2013 |
| WO | 9404357 A1 | 3/1994 |

*Primary Examiner* — Monica A Huson
(74) *Attorney, Agent, or Firm* — The Webb Law Firm

(57)　　　　　　　ABSTRACT

A method for pre-forming a curved thermoplastic laminate to be incorporated in composed automotive windows, the method including the processing steps of; providing a thermoplastic laminate, clamping said thermoplastic laminate from opposite flat sides between a first and a second flexible clamping layer, applying a clamping force to the thermoplastic laminate, heating the clamped thermoplastic laminate, forming the clamped and heated thermoplastic laminate, and cooling the thermoplastic laminate. The invention also relates to a pre-formed thermoplastic laminate that is pre-formed by such method as well a system for pre-forming such a thermoplastic laminate.

17 Claims, 1 Drawing Sheet

(51) Int. Cl.
  *B29C 51/42*      (2006.01)
  *B32B 17/10*      (2006.01)
  *B29L 9/00*      (2006.01)

(52) U.S. Cl.
  CPC .. *B32B 17/10211* (2013.01); *B32B 17/10495*
      (2013.01); *B32B 17/10844* (2013.01); *B32B*
      *17/10889* (2013.01); *B29L 2009/00* (2013.01)

(58) Field of Classification Search
  CPC . B32B 27/36; B32B 17/10211; B32B 27/306;
      B32B 17/10005; B32B 2367/00; B32B
      17/10532; B32B 17/10504; B29C 51/428;
      B29C 51/10; B29C 51/14; B29L 2009/00
  See application file for complete search history.

(56)           References Cited

U.S. PATENT DOCUMENTS

| 6,261,398 B1 | 7/2001 | Costa |
| 2004/0231778 A1 | 11/2004 | Teschner et al. |
| 2007/0209393 A1 | 9/2007 | Miller et al. |

METHOD FOR PRE-FORMING A CURVED THERMOPLASTIC LAMINATE AND PRE-FORMED THERMOPLASTIC LAMINATE

CROSS-REFERENCE TO RELATED APPLICATIONS

This application is the United States national phase of International Application No. PCT/NL2022/050349 filed Jun. 20, 2022, and claims priority to The Netherlands Patent Application No. 2028493 filed Jun. 21, 2021, the disclosures of which are hereby incorporated by reference in their entireties.

BACKGROUND OF THE INVENTION

Field of the Invention

The present invention relates to a method for pre-forming a curved thermoplastic laminate to be incorporated in a composed automotive window. The invention is further related to a curved thermoplastic laminate.

Description of Related Art

In the car industry there is a growing demand for adding more functionalities into the glass. Active interlayers like Polymer Dispersed Liquid Crystal (PDLC), Suspended Particle Devices (SPD), Electro Chrome technologies, electrophoresis, and also passive interlayers are therefor also more integrated into automotive glass.

Most active interlayers now available on the market are assembled from 2 or more coated thermoplastic films. In most cases these films are PET (Polyethylene terephthalate) or PEN (polyethylene naphthalate) based films with on each of the facing sides an ITO (Indium Tin Oxide) coating and/or having in between two conductive coatings a dispersed liquid crystal formula, suspended-particle devices, or electro chromic substrates. All these layers have in common that if an electric current flows between two conductive layers the active state of the film changes from the static translucent diffuse state to a translucent clear state, or reverse. This change of state thus changes the light transmission and/or color of the intermediate layer. This technology is also known as "smart film technology" or if integrated between two or more glass sheets as "smart film interlayer technology". Although PET and other plastic films like e.g. TAC (Celulose Triacetate) are already widely used in curved automotive glass, e.g. for their infrared reflecting properties and/or heating properties, and/or they are used for their optical usage. Windshields of cars are often curved in at least one direction. Since the demand for incorporating thermoplastic films inside automotive windows is increasing, techniques for doing so are in high demand. Bending a thermoplastic film between two sheets of glass generally causes the thin thermoplastic film to fold or wrinkle. In order to overcome this undesirable effect, it is known to provide the thermoplastic film onto only one sheet of glass and preform said stack of the thermoplastic film and glass sheet into the desired shape. The second sheet of glass can subsequently be applied, which decreases the amount of wrinkling of the thermoplastic film. However, also using these techniques the amount of wrinkles is significant, in particular when a double curvature is needed, or when the magnitude of the curve is bigger. Also thermoforming before laminating is a known method. The already existing production methods are however not useable for thermoforming smart films (or thermoplastic laminates). This is caused by several circumstances. For instance the dispersed polymers are getting weak at thermoforming temperatures, smart films normally have busbars and connectors applied, and smart films are normally sensible for weather conditions so all edges should be covered inside the laminating stack all around to provide an edge encapsulation.

In general, If a film material is bended from a flat shape in to a double curved surface, some regions will experience a local compression and/or decompression (stretch), while other regions of the film stays unaffected. This is dependent on how the surface is curved and also the shape of the outer boundary has a strong influence on local presence or absence of compression and/or decompression in the film. The local compression and/or decompression of the film material causes the film material to wrinkle, typically along the edges thereof. The degree of wrinkling increases as the film material is increased in size, or when the curvature, in particular the double curvature is stronger or larger. In general most spherically bended multilayered glass panel have a central area of where the film arranged inside the glass panel is stretched (decompressed)—near the middle of the gravity point—and four areas of compression near the middle of four longitudinal sides (edges).

The areas where decompression or compression occurs can mathematically be determined by drawing a set of geodetic splines (gs") over a spherically bend surface (s), were all geodetic splines (gs") start from the same center point (cp) on the surface. Geodetic in this context means that it describes the shortest possible path (elastic string) from the starting center point (cp) to the boundary perimeter of the surface in a given angle to a neighboring geodetic spline (gs-next) starting for the same point (cp) on the surface in a repeatedly new directions. The repetition is done so that 360° of the surface is covered. All geodetic splines (gs") are divided in a given number of equal segments were the equal segments are interconnected by geodetic cross splines (gcs"), thus creating geodetic triangles (gs', gcs', gcs"). The local surface area is then calculated for each triangle shaped piece of the curved surface. The length of the separate splines (a") is calculated and redrawn from the same start point (cp) in the same direction as a flat line (fl") with the same length as the corresponding geodetic spline (gs"), while respecting the start point and angle of the corresponding neighbor line. These new sets of flat lines are then divided in the same number of equal segments as the corresponding geodetic spline (gs) and if these equal segments are now interconnected the flat cross lines (fcl') create flat triangles. When a local flat triangular surface area is then calculated and the outcome is divided by the outcome of its corresponding local curved triangular surface, the percentage of decompression or compression in that specific region is determined. If the outcome is for a specific area is larger than 1, the area is compressed, while if the outcome is smaller than 1, the area is decompressed (stretched). If the outcome is equal to 1 no stress is locally applies. The mathematical outcome differs if the start point (sp) varies on the surface. And also the relative plane from the flattened sets of lines influence the outcome and should therefore preferably be leveled to 90° to the perpendicular axis from the center of gravity of the surface. The smaller the repeating angle and the bigger the number of line segments the more accurate decompression/compression determination will be.

Also a plasticity module needs to be calculated to know the level of compensation and flexibility of the specific thermoplastic smart film, which gives insight in the acceptable amount of specific compression and/or decompression of that specific film.

One of the current drawbacks for using active interlayer films is the limited possibility to use it for double bended curvatures, as the active interlayer films according to the prior art easily wrinkle and/or crack during the laminating process. The level to where laminating active interlayer films (smart films or thermoplastic laminates) are starting to be problematic is at about 0.2% edge compression (1.002) and/or about 0.3% decompression (0.997) (plasticity module not compensated). If smart film interlayers are used in curved glass shapes exceeding these levels a pre-forming of the interlayer smart film is required to avoid unwanted wrinkles. Decompression is only partly to be absorbed by stretching the film while also material may be pulled from the boundary towards the center, thus also creating wrinkles. In practice the acceptable level of stress (decompression) may only slightly be higher than the acceptable level of compression.

A result of using the known methods is also that shrinkage of the inner and outer PET layer is never complete simultaneal and/or homogenous and two layers may locally separate from each other and/or wrinkle. These problems are even worse when vacuum is applied from the mould in a situation wherein the film is sucked to the mould on one side, while no suction is applied on the other (opposite) side. So a pre-cut pre-bonded and pre-shaped smart film is not a solution to avoid wrinkles and cracks.

Where in this application thermoplastic laminate is mentioned, this may be understood as at least one thermoplastic film, and preferably at least one bonding layer. Preferably, said thermoplastic laminate comprises at least two thermoplastic films, optionally wherein between the at least two thermoplastic films the thermoplastic laminate comprises a dispersed liquid crystal formula, and/or a suspended-particle devices, and/or a electro chromic substrate and/or a electrophorese device. Yet further the thermoplastic laminate may comprise at least two bonding layers, wherein said bonding layers preferably form the outer layers of the thermoplastic laminate.

It is therefore a goal of the present invention to provide a method for pre-forming double curved laminate, wherein the laminate is less prone to wrinkling and cracking during double curvature forming.

SUMMARY OF THE INVENTION

The present invention thereto proposes a method for pre-forming a curved thermoplastic laminate to be incorporated in composed automotive windows, the method comprising the processing steps of a) providing a thermoplastic laminate, said thermoplastic laminate comprising at least one thermoplastic film and preferably at least one adjacent layer of bonding material, b) clamping said thermoplastic laminate from opposite flat sides between a first and a second flexible clamping layer, c) applying a clamping force to the thermoplastic laminate, said clamping force having at least a component perpendicular to the thermoplastic laminate situated between the first and second clamping layer, d) heating the clamped thermoplastic laminate to a predefined temperature, e) forming the clamped and heated thermoplastic laminate in contact with at least one mould part, wherein the contact surface of the mould part is a double-curved contact surfaces, and f) cooling the thermoplastic laminate, wherein the clamping force applied during processing step c) is at least partially maintained during processing step d).

Due to the first and second clamping layer the present invention allows for pre-forming a thermoplastic laminate without wrinkling, even though the laminate is pre-formed in a relatively strong double curvature. According to the prior art this is not possible, since mostly the laminate is heated, and subsequently formed under only the pressure of a mould. However, if the mould has a double curved mould surface this causes the laminate to be compressed and decompressed too much, resulting in wrinkles in the laminate in areas where the compression or tension increases over a threshold value. This is prevented in the present invention by applying a clamping force onto the laminate. Preferably, during processing step c) the clamping force is applied to the thermoplastic laminate from opposite sides of the thermoplastic laminate by the first and second flexible clamping layer. It is especially beneficial if the force is applied to the laminate from either side, that is from both the upper and lower surface of the laminate. This results in an evenly compressed laminate, which significantly reduces the chance of wrinkles to incur into the laminate during forming over the mould. It has turned out not to be sufficient to only apply vacuum from the mould because the laminate is then sucked to the mould on only one side whereas the other side is not suppressed and is still prone to wrinkle. This is especially the case when using multi layered laminates, since the vacuum may retain only a single layer thereof, whereas the other layers may wrinkle significantly with respect to said vacuum retained layer. The laminate may be positioned between the first and second clamping layer in a substantially flat orientation. This increases the usability since it is easy to position the laminate in said flat orientation, especially when a multi-layer laminate is used. This further allows for an increased efficiency, since a plurality of laminates may be prepositioned between a plurality of first and second clamping layers, each stored separately. After the laminate is positioned onto one (first) clamping layer, the other (second) clamping layer may be positioned on top of the laminate, covering the laminate, hence forming a sandwich of clamping layer, laminate and clamping layer, which sandwich may be easily handled and stored as such. Note that the laminate which is allocated between the clamping layers may still be in a substantially flat orientation, which furthermore contributes to easy handling and storage thereof. However, the invention is not limited to this example, it is also conceivable to position the laminate between the clamping layers in an already slightly curved orientation. After the laminate is placed between the clamping layers, a clamping force is exerted onto the laminate. Said clamping force may be exerted from a single side, such as pressing on the first clamping layer, which pushes the entire laminate to the second clamping layer. However, it is preferred that the clamping force is applied to the thermoplastic laminate from opposite sides of the thermoplastic laminate by both the first and second flexible clamping layer. By exerting the clamping force on the entire laminate, the position on the laminate is retained, even when limited shear forces occur under the forming step. Prior to forming the laminate, the clamped thermoplastic laminate is heated, which allows the laminate to be formed more easily. Preferably, during the heating step, the temperature of the thermoplastic laminate is heated above the glass transition temperature of the thermoplastic laminate, yet optionally also heated to the rubbery state of the thermoplastic film. During the heating step, the clamping layers force the thermoplastic laminate to remain flat. Preferably, step e) is executed after the thermoplastic laminate has reached a predefined temperature. Said predefined temperature is preferably at or above the glass transition temperature of the thermoplastic laminate, in particular the thermoplastic layers thereof. As such, a double curved thermoplastic laminate may be pre-formed which is essentially free of wrinkles. Also, the thermoplastic film may be provided initially in a stress free state. That is, the at least one thermoplastic film is placed free of tension, such as a stretching tension, within the clamping layers. This specific order according to the present invention, that is, heating the laminate first, and forming the laminate subsequently, is advantageous. By heating the laminate prior to forming the laminate, the molecules or polymer chains of the thermoplastic film are in a state that allows more mutual mobility or movement of said molecules or polymer chains without introducing excessive internal tension in the thermoplastic film and hence reducing the wrinkles. It is in particular beneficial when the thermoplastic film is heated when in flat condition. Hence, preferably the thermoplastic laminate, in particular the thermoplastic film is heated when it is not subject to bending and/or stretching forces. This allows the thermoplastic laminate to heat more evenly. Additionally, by heating the thermoplastic laminate, in particular the thermoplastic film, the molecules or polymer chains are more mobile, and are less capable of influencing tension to the edge perimeter of the thermoplastic laminate, in particular the thermoplastic film. It is in particular said tension that may cause compressed tension, and hence wrinkle the thermoplastic film. The increased mobility of the thermoplastic film thus may be more easily formed without introducing wrinkles. Preferably, at least one, preferably the at least two flexible clamping layers extend beyond the size of the thermoplastic film situated between said flexible clamping layers. That is, the thermoplastic laminate is essentially only clamped by the interior surfaces of the flexible clamping layers, that is, the surfaces of the clamping layers that are mutually facing. Preferably, the at least two flexible clamping layers enclose substantially the entire thermoplastic laminate. That is, the surface of the thermoplastic laminate is smaller than the flexible surface of the flexible clamping layers. This allows to provide for an even pressure onto the thermoplastic laminate, up to the perimeter thereof. As such, clamping said thermoplastic laminate around its perimeter is not required. This allows to form a directly usable fabricate, wherein cutting off excess material, in particular a segment of material around the perimeter that was clamped, is not necessary. The size of the thermoplastic film, the functional film (e.g., the liquid crystal layer or alternative thereof), and/or the bonding layer may mutually differ. The size of the thermoplastic film may thus be smaller than the size of the bonding layer, which is favorable when forming an edge seal of the thermoplastic laminate.

Presently, the thermo-forming methods according to the prior art do not allow for simultaneously pre-forming a combination of a high modulus layer and a low modulus layer. A high modulus layer may for example be a PET layer, or TAC layer, a low modulus layer may for example be a PVB layer or a TPU layer. The present invention is however not limited to these examples. This problem in particular occurs where the high modulus layer does not stretch to the perimeter of the low modulus layer.

For example, when having a thermoplastic laminate wherein the high modulus thermoplastic film is not stretching to the perimeter of the low modulus bonding layer, and the thermoplastic laminate would be clamped for preforming, said clamp would be located at the perimeter of the low modulus bonding layer. When pre-forming according to the known method, the low modulus bonding layer would be stretch, in particular in the portion where it stretches beyond the high modulus thermoplastic film towards where it is clamped. This is undesired, since it introduces a discrepancy between the stretch of the low modulus layer and the high modulus layer, as a result of which wrinkles and/or inconsistencies may be introduced into the thermoplastic laminate.

That is, where e.g., the PET layer does not stretch to the perimeter of the PVB layer. The known pre-forming methods would introduce wrinkles, which is an undesired effect. This is in particular important in case of automotive windows, since the thermoplastic film, in particular the functional film thereof, needs to be encapsulated by the bonding layer(s) for protecting the thermoplastic laminate of external influences, such as the weather. This requires the bonding layer(s) to stretch beyond, preferably a significant part or entire part of, the perimeter of the thermoplastic film. The present invention however, allows the thermoplastic film and the bonding layer to be clamped over a significant, preferably the entire, surface, such that different rates of extension are reduced. Moreover, the clamp may be situated outside the perimeter of the largest layer of the thermoplastic film and bonding layer, such that the entire thermoplastic laminate is situated between the clamping layers, and that the vacuum provides for an essentially uniform pressure onto the thermoplastic laminate. To this end, it is of benefit that the clamping layers are flexible clamping layers. This allows the clamping layers to be positioned onto both sides of the thermoplastic laminate and may prevent wrinkles from forming. That is, the flexible clamping layer may adjust according to the shape of the thermoplastic laminate prior to forming a vacuum. As such, wrinkles may be suppressed during pre-forming of the laminate. The thermoplastic laminate, in particular the bonding layer and the thermoplastic film may thus stretch in essentially the same rate, and hence preventing said layers from unevenly stretching and as such forming wrinkles and/or inconsistencies. Another advantage is that the vacuum inside the flexible clamps, hence the flexible clamping layers, which, preferably airtightly, surrounds, and as such 'bags' the thermoplastic laminate, may de-air the stack of thermoplastic- and bonding-layers. This may allow that after heating, the at least partially molten and later cooled down, frozen bonding layers will form a whole with their encapsulated functional layers or film(s). The bonding layer(s) protect the sensitive functional layer(s) or film(s) against damage. This is because there is no direct contact to the mould(s) or clamp(s) during forming. But also after pre-forming, protection is maintained during transport as well as during the final lamination process with both sides of the glass. During the forming step e) the clamped and heated laminate is formed by at least one mould part. Said mould part is in particular a double curved mould part. Said double curved mould part may be either a double curved convex or concave surface. The clamping force applied during step c) is at least partially maintained during the heating step d). Preferably, the clamping force applied during step c) is at least partially maintained during the forming in step e), preferably the clamping force is substantially entirely maintained during the forming step and heating step. This prevents the laminate from wrinkling during the forming or heating step. Due to this forming step normally, that is, without said clamping layers, shear or other forces are introduced into the laminate causing the laminate wrinkle after a certain amount of deformation. It is conceivable that, prior to heating in step d), the clamped laminate is formed (step e)). That is, the thermoplastic laminate as clamped during steps b) and c) is formed into the desired shape prior to heating, as in step d) the thermoplastic laminate. After forming the laminate into the desired double curved shape, the laminate is cooled down. Cooling the laminate preferably occurs while the laminate is still in the forming position. To this end, the laminate may be cooled while it is still between the first and second clamping layer. More preferably, the laminate is cooled while it is both between the clamping layers and positioned onto the at least one mould part in its preferred double curved shape. This cooling step essentially stabilizes or "freezes" the shape of the laminate.

The present invention provides for significant advantages over the prior art. For example, vacuum forming, which may also be called draw forming, is subject to several disadvantages. First of all, vacuum forming requires the sheet of material to be clamped around its perimeter in order to be pulled to a tool. Said tool may be a negative or positive mould. The pulling may be initiated by e.g., vacuum. After forming the product out of the sheet of material, the edges need to be trimmed in order to obtain the final formed product. Since the sheet of thermoplastic material in the present invention is clamped between flexible layers, there is no need for clamping the sheet of material during the forming step. Therefore, there is no need to cut off excess material around the perimeter. This is of great importance since the thermoplastic films, especially in case liquid crystals are applied, may introduce defects to the product. This is mainly since cutting the thermoplastic laminate, in case a liquid crystal or other switchable film or active interlayer is applied, exposes said switchable film or active interlayer to the environment which may then oxidate. Hence, the present invention allows for eliminating an entire production step, which is trimming the thermoplastic laminate.

Where in this application it is mentioned pre-forming a thermoplastic laminate to be incorporated in composed automotive windows, it is in particular meant a thermoplastic laminate only. That is, without also simultaneously forming one or more sheets of glass. Such procedure is significantly different over the objective of the present invention, where essentially only the thermoplastic laminate is pre-formed, such as to be provided with a predefined curvature. This provides the advantage that the pre-formed thermoplastic laminates may be fabricated separate of the automotive glass. Moreover, when stronger or larger curvatures are desired, the difference in material properties between the glass sheets and the thermoplastic laminate are too big, which inevitably causes the thermoplastic laminate to wrinkle. Hence, pre-forming of the thermoplastic laminate may is such instances provide for a solution to achieve a relatively strong or large curvature, in particular in case of a double curvature, wherein the thermoplastic laminate is not subject to wrinkling. Preferably, the first and second clamping layer are substantially gas impermeable. That is, the thermoplastic laminate is clamped between a first substantially gas impermeable clamping layer and a second substantially gas impermeable clamping layer during step b). This prevents any gas from penetrating through the clamping layers, which increases the clamping capabilities of said layers and is also allows for exerting a better clamping force onto the laminate, which furthermore reduces the chances of wrinkling. To this end, the clamping layers or flexible membranes may be composed out of silicone, rubber, EPDM, an airtight cloth, or the like.

In another embodiment, the clamping force applied during processing step c) is applied over substantially the entire surface of at least one flat side, preferably both the opposite flat sides of the thermoplastic laminate. By applying a clamping force over the entire surface of at least one flat side, preferably both the opposite flat side of the thermoplastic laminate, an optimal distribution of the clamping force may be realized. This allows all the locations of the laminate to be equally pressurized. In other words, the clamping force is substantially identical on every location of the laminate, at least in the horizontal orientation thereof.

In a further embodiment the flexible first and second clamping layer (flexible membranes) are attached to individual frames and said frames are moved between a clamping position, wherein the frames are pressed together, and an inactive position, wherein the frame parts are placed apart. Preferably, the first and second flexible clamping layers are provided on the sides of the frames facing towards each other, such that the layers are clamped optimally. Yet, it is also conceivable that the flexible clamping layers are attached to sides of the frames facing inwardly, in case the sides of the frames facing towards each other are provided with sealing elements, which make sure that the two frames are substantially entirely gas tightly when pressed together in the clamping position. The size of the individual frames is larger than the size of the thermoplastic laminate, such that the laminate may be positioned inside the (boundaries of) the fame. To this end it is furthermore preferred that the two frames are endless individual frames. The frames may for example be composed out of metal, such as steel, aluminum, or the like. Preferably, an inside perimeter of at least one of said frames, preferably each of said frames, is larger than a perimeter of the thermoplastic laminate. As such, the thermoplastic laminate is substantially entirely located between the flexible portion of the flexible clamping layer. This may allow for producing a pre-formed laminate wherein the laminate does not require further processing, such as trimming of excess material around the perimeter.

Preferably, during processing step c) the clamping force is increased by creating a vacuum between the flexible first and second clamping layers, causing an vacuum pressure on the opposite flat sides of the thermoplastic laminate. The vacuum may be applied for keeping the layers of the thermoplastic laminate parallel during the forming and heating step. Preferably, wherein gas is extracted from the space enclosed by the clamped together flexible first and second clamping layer via vacuum feed attached to this space. The vacuum feed, for instance a hose, may be integrally formed with the first and/or second clamping layer, or may be attached through a valve, preferably a one way valve. During the heating or the forming the vacuum feed, which extracts the air from the space enclosed by the first and second flexible clamping layer is kept in connected condition during heating and forming, possibly also during cooling, such that the vacuum pressure is maintained as low as possible. It is also conceivable that a one way valve is used, such that during preparation, that is positioning the laminate between the first and second flexible clamping layer, the vacuum may be applied. Subsequently the vacuum hose may be disconnected once the vacuum is properly applied. This allows to store the laminate, which is thus clamped between the first and second flexible clamping layer, and to which a vacuum pressure is applied, prior to the subsequent steps, given that the space between the clamping layers does not lose its vacuum pressure. Preferably, the curvature of the thermoplastic laminate comprises a maximum lens formation of 0.2 diopter, preferably 0,145 diopter, more preferably 0.07 diopter. Optionally, The thermoplastic laminate is essentially free of a lens formation larger than 0.2 diopter, preferably 0,145 diopter, more preferably 0.07 diopter. Preferably, the curvature in both direction is at least 0.01 diopter.

Since the present invention is related to thermoplastic laminates for automotive windows, lens formation is an undesired effect, since it may cause the driver to misinterpret distances of cars in front or behind.

In a preferred embodiment, the thermoplastic laminate is cooled by forcing a cooling gas through the at least one mould part during processing step f). As such, the thermoplastic laminate is in the desired form, and by cooling the laminate in that position, the laminate is stabilized ("frozen") in said position, which results in the laminate being held in the desired shape. This may be realized by using a mould that comprises a plurality of tiny holes, extending from a bottom side of the mould to the surface facing towards the laminate during forming. By blowing the cooling gas through said holes, the cool gas is forced against one of the flexible clamping layers, and hence cooling the laminate clamped therein. Since the outer surface of the clamping layer that is abutted against the mould has a micro surface, that is, no material can be infinitely smooth, the air that is blown through the mould can find its way through surface of the clamping layer and the mould surface facing towards said layer. It is also conceivable that two mould halves are used, in which case this embodiment may be applied to both mould halves, hence causing the laminate to be cooled from both surfaces.

A laminate can thus be thermo pre-formed by two frames, each frame covered by a flexible (airtight) membrane, which membranes are stretched and preferably airtight fitted to the frames. The two frames together may thus form a flexible vacuum clamp wherein the smart film, that is the thermoplastic laminate, is positioned in the middle. Then a vacuum may be applied, preferably with the thermoplastic laminate still in flat and non-heated condition. Subsequently the frames along with the clamping layers (flexible membranes) are kept under vacuum and the thermoplastic laminate is heated to above the glass transition temperature, preferably between 90 and 170° Celsius. The heated thermoplastic laminate may then be pressed into shape against/over at least one mould, but preferably pressed between two mould parts. After the heated forming of the thermoplastic laminate the thermoplastic laminate (smart film) may be cooled so that it retains the desired form/shape. Cooling may for instance be realized by applying cool air, or another gas, through the contact surface(s) of the mould part(s). The pressure exerted by the clamping layers should preferably of a level to maintain sufficient pressure on the thermoplastic laminate during the entire heating stage and at least the start of the cooling phase. Both the vacuum as well as the pressure exerted by the clamping layers prevent the film from wrinkling during heating and forming as well as it prevents the layers of the thermoplastic laminate to be torn apart during heating and forming. Preferably the clamping layers have an antistick coating and/or separation layer which enables to integrate one or two bonding layers on the outside of the thermoplastic laminate, and thus assemble the thermoplastic laminate in a single step including one or two external bonding layers. Preferably the contact side of at least one of the flexible clamping layers is provided with an antistick layer or coating, wherein such antistick layer also may have a de-airing surface structure. Such de-airing surface structure may also, or as an alternative, be present in the external layer(s) of the thermoplastic laminate and will help to vacuumize the space between the clamping layers. In this respect is also noted that a de-airing surface of one or more of the external layer(s) of the thermoplastic laminate may also be helpful in the subsequent laminating process of the thermoplastic laminate (smart film) in a multilayers glass panel (window shield). The thickness of the flexible clamping layers may relate to the thickness of the thermoplastic laminate to be formed as well as the required level of pressure to be exerted by the clamping layers.

Preferably the thermoplastic laminate comprises at least two thermoplastic films. Using the method according to the present invention laminates comprising two or more thermoplastic films, may be pre-formed without wrinkles being introduced in any of the film layers. Additional to the thermoplastic film, the laminate may comprise one or more layers of binding material, such as a PVB, EVA or TPU. Preferably, at least one, more preferably both of the sides of the thermoplastic films facing towards each other are coated by a conductive material, preferably Indium Tin Oxide (ITO). Furthermore, it is conceivable that in between the at least two thermoplastic films the thermoplastic laminate comprises a dispersed liquid crystal formula, and/or a suspended-particle devices, and/or a electro chromic substrate. This allows the pre-formed laminate to have a predetermined functionality. The present invention is however not limited to these examples. It is conceivable that any functional film or smart film may be included in the thermoplastic laminate, and thus pre-formed according the present invention, resulting in a double curved laminate substantially entirely free of wrinkles in any of the included layers.

Preferably during processing step d) the thermoplastic laminate is heated to a temperature situated between 80° C. and 160° C., preferably between 115° C. and 135° C. These temperature ranges have turned out to result in a sufficient level of deformability of the thermoplastic laminate, without damaging the layers.

In yet a further embodiment according to the present invention at least two cooperating mould parts are used, both mould parts having double-curved contact surfaces to be used during processing step e). That is, step e) is in particular forming the clamped and heated thermoplastic laminate between two opposite mould parts, wherein the contact surfaces of the mould parts are double-curved contact surfaces. This allows for an accurate shaping of the thermoplastic laminate. In addition to the pressure exerted by the clamping layers, a mould force is applied by more or less pressurizing the two mould halves together. It is beneficial when two cooperating mould halves are used to this end since this may result in an evenly distributed pressure distribution. The mould halves are compatible to one another. For example, one mould halve may have a convex double curved surface, and the other halve may have a concave double curved surface which is complementary to the first half. The shape of the mould is preferably chosen slightly more curved with respect to the final curvature that is desired to be in the automotive glass. That is done in order to counteract for the memory of the material of the laminate. That is, once the laminate is positioned between the glass sheets, and heated again, the material will slightly relax, which could affect the pre-formed laminate in such a way that it may not be sufficiently curved. By taking this slight deformation into account during the pre-forming phase, the curvature of the laminate is exactly right once reheated to be merged between the glass sheets of the automotive glass.

The present invention is also related to a pre-formed thermoplastic laminate, said pre-formed thermoplastic laminate comprising, at least one thermoplastic film, at least one bonding layer, said bonding layer attached, directly or indirectly to a side of the thermoplastic film, and wherein said bonding layer stretches beyond at least a part of the perimeter of the thermoplastic film, wherein the thermoplastic film comprises a curvature, in particular a double curvature, wherein the thermoplastic laminate is essentially free of internal stresses. Free of stresses in respect of the double curved thermoplastic laminate may be understood as at least the mutual stresses between the thermoplastic film and the bonding layer being negligible. Yet, this may also be understood as the bonding layer and thermoplastic film having essentially the same rate of extension and/or compression. In particular as compared to an, uncurved, initial flat state of the thermoplastic laminate. This may in particular be achieved by means of the process according to the present invention. Preferably, the thermoplastic laminate comprises at least two thermoplastic films. In particular wherein least one, preferably both of the sides of the thermoplastic films facing towards each other are coated by a conductive material, preferably Indium Tin Oxide (ITO). Imaginable, in between the at least two thermoplastic films the thermoplastic laminate comprises a dispersed liquid crystal formula, and/or a suspended-particle devices, and/or a electro chromic substrate. Preferably, the thermoplastic laminate comprises two bonding layers, applied on an upper surface and lower surface of the thermoplastic film. In this respect, preferably no mutual (residual) stresses are present between both bonding layers and the thermoplastic film. The pre-formed thermoplastic laminate is preferably pre-formed via the method according to the present invention. The same benefits apply as substantiated with respect to the method according to the present invention.

The present invention is further related to a pre-formed thermoplastic laminate, in particular a pre-formed thermoplastic laminate, wherein the thermoplastic laminate is pre-formed by the method according to the present invention. With respect to the pre-formed thermoplastic laminate according to the present invention the same advantages apply as elucidated with respect to the method according to the invention. Therefore, the advantages related to the method are hereby incorporated with reference to the advantages in relation to the above advantages of the pre-formed thermoplastic laminate according to the invention.

The present invention is further related to a system for pre-forming a thermoplastic laminate, wherein the system is configured for executing the method according to the present invention. With respect to the pre-formed thermoplastic laminate according to the present invention the same advantages apply as elucidated with respect to the method according to the invention. Therefore also these advantages are incorporated here in relation to the system for pre-forming a thermoplastic laminate.

BRIEF DESCRIPTION OF THE DRAWINGS

The terms Fig., Figs., Figure, and Figures are used interchangeably to refer to the corresponding figures in the drawings.

The present invention will further elucidated with reference to the non-limitative embodiments shown in the following figures. Herein shows.

DESCRIPTION OF THE INVENTION

Figure 1:
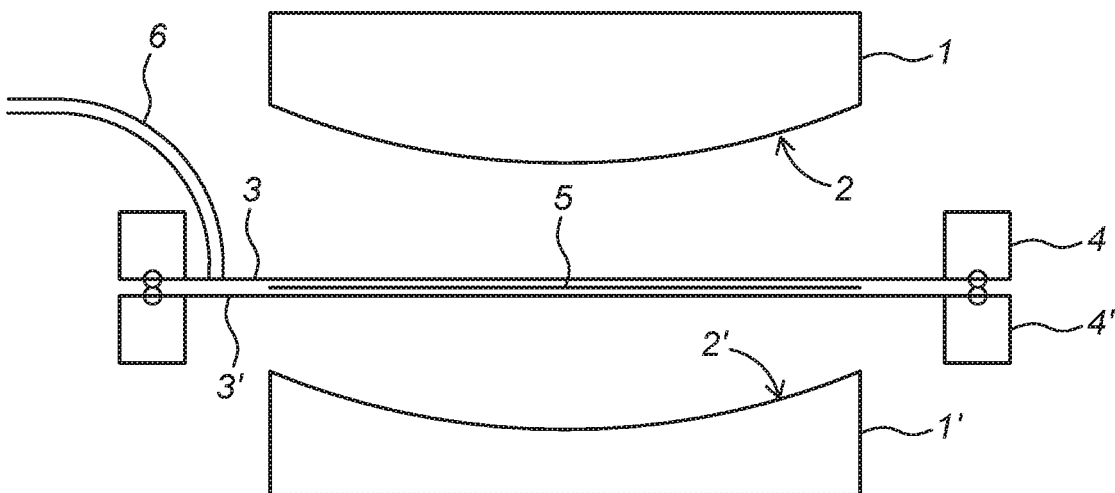
FIG. 1 a schematical side view of a system for executing the method.

FIG. 1 shows a schematic side view of a first mould halve 1 and a second mould halve 1', wherein a surface 2 of the first mould halve 1 that is facing towards a thermoplastic laminate 5 is a double curved surface, in particular a convex double curved surface. The thermoplastic laminate 5 is depicted to be positioned between a first flexible clamping layer 3 and a second flexible clamping layer 3'. The first and second flexible clamping layers 3, 3' are both stretched and attached to a respective first and second frame part 4, 4'. In the illustrated situation there is no clamping force exerted onto the laminate 5 by the clamping layers 3, 3'. However, a vacuum hose 6 that is attached to the first clamping layer 3 could be activated in order to extract air that is enclosed by the first and second clamping layer 3, 3' and the frame portions 4, 4'. If an under pressure is realized between the clamping layers 3,3', these clamping layers 3, 3' will exert a clamping force onto the thermoplastic laminate 5. Since the clamping force in this non-limitative embodiment is induced by the vacuum that is generated in the space enclosed by both the clamping layers 3, 3' and the frame parts 4, 4' the clamping force is automatically exerted from opposite sides of the thermoplastic laminate.

Figure 2:
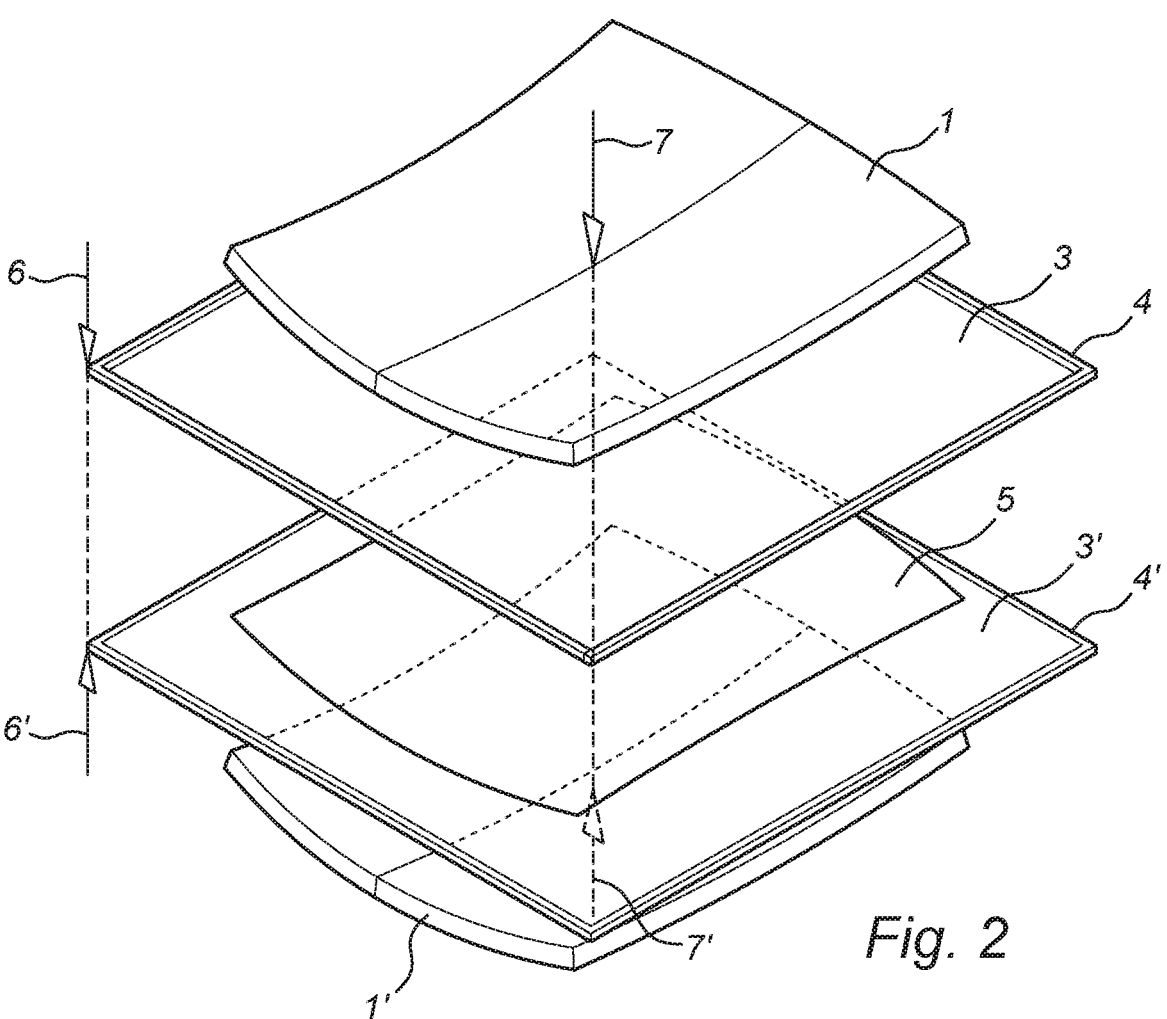
FIG. 2 a schematical perspective and partially exploded view of the system.

FIG. 2 depicts a schematic and exploded perspective view of a process step in the pre-forming of a curved thermoplastic laminate wherein the corresponding elements with the representation in FIG. 1 are referred to with identical reference signs. In this figure the laminate 5 is positioned onto the clamping layer 3'. Subsequently, once the laminate 5 is correctly positioned onto the clamping layer 3', the top and bottom frame part 4, 4' are moved towards each other, as indicated by the arrows 6, 6'. Once the two frame parts 4, 4' are brought together, (in line with the situation represented in FIG. 1) a clamping force may be applied onto the laminate 5 to maintain the mutual orientation of individual layers of the laminate 5. After the clamping force is applied, the laminate 5 is heated, after which the two mould halves 1, 1' are pressed together by moving them towards each other (see arrows 7, 7'). After the mould halves being pressed together, and thereby force the laminate 5 to follow the shape of the mould surfaces 2, 2', the laminate 5 is cooled, e.g. by forcing cooling gas through the mould 1, 1' to stabilize the laminate 5 in this position.

The invention claimed is:

1. A method for pre-forming a curved thermoplastic laminate to be incorporated in composed automotive windows, the method comprising the processing steps of;
   a) providing a thermoplastic laminate, said thermoplastic laminate comprising at least one thermoplastic film,
   b) clamping said thermoplastic laminate from opposite flat sides between a first and a second flexible clamping layer,
   c) applying a clamping force to the thermoplastic laminate, said clamping force having at least a component perpendicular to the thermoplastic laminate situated between the first and second clamping layer,
   d) heating the clamped thermoplastic laminate to a predefined temperature,
   e) forming the clamped and heated thermoplastic laminate in contact with at least one mould part, wherein the contact surface of the mould part is a double-curved contact surfaces, and
   f) cooling the thermoplastic laminate,
   wherein the clamping force applied during processing step c) is at least partially maintained during processing step d).

2. The method for pre-forming a curved thermoplastic laminate according to claim 1, wherein the flexible clamping layers are substantially gas impermeable.

3. The method for pre-forming a curved thermoplastic laminate according to claim 1, wherein during processing step c) the clamping force is applied to the thermoplastic laminate from opposite sides of the thermoplastic laminate by the first and second flexible clamping layer.

4. The method for pre-forming a curved thermoplastic laminate according to claim 1, wherein during processing step c) the clamping force is applied over substantially the entire surface of at least one flat side.

5. The method for pre-forming a curved thermoplastic laminate according to claim 1, wherein the flexible first and second clamping layer are attached to induvial frames and said frames are moved between a clamping position, wherein the frames are pressed together, and an inactive position, wherein the frame parts are placed apart.

6. The method for pre-forming a curved thermoplastic laminate according to claim 1, wherein during processing step c) the clamping force is increased by creating a vacuum between the flexible first and second clamping layers, causing an vacuum pressure on the opposite flat sides of the thermoplastic laminate.

7. The method for pre-forming a curved thermoplastic laminate according to claim 6, wherein gas is extracted from the space enclosed by the clamped together flexible first and second clamping layer via vacuum hose is attached to this space.

8. The method for pre-forming a curved thermoplastic laminate according to claim 1, wherein during processing step f) the thermoplastic laminate is cooled by forcing a cooling gas through at least one of the mould parts.

9. The method for pre-forming a curved thermoplastic laminate according to claim 1, wherein the thermoplastic laminate comprises at least two thermoplastic films.

10. The method for pre-forming a curved thermoplastic laminate according to claim 9, wherein at least one of the sides of the thermoplastic films facing towards each other are coated by a conductive material.

11. The method for pre-forming a curved thermoplastic laminate according to claim 9, wherein in between the at least two thermoplastic films the thermoplastic laminate comprises a dispersed liquid crystal formula, and/or a suspended-particle devices, and/or a electro chromic substrate.

12. The method for pre-forming a curved thermoplastic laminate according to claim 1, wherein during processing step d) the thermoplastic laminate is heated to a temperature situated between 80° C. and 160° C.

13. The method for pre-forming a curved thermoplastic laminate according to claim 1, wherein during processing step e) at least two collaborative mould parts are used, both mould parts having double-curved contact surfaces.

14. The method for pre-forming a curved thermoplastic laminate according to claim 1, wherein the contact side of at least one of the flexible first or second clamping layers is provided with an antistick layer.

15. The method for pre-forming a curved thermoplastic laminate according to claim 1, wherein step e) is in particular forming the clamped and heated thermoplastic laminate between two opposite mould parts, wherein the contact surfaces of the mould parts are double-curved contact surfaces.

16. A pre-formed thermoplastic laminate, wherein the thermoplastic laminate is pre-formed by the method according to claim 1.

17. A system for pre-forming a thermoplastic laminate, wherein the system is configured for executing the method according claim 1.

* * * * *